US006724704B2

(12) United States Patent
Kuroda

(10) Patent No.: US 6,724,704 B2
(45) Date of Patent: Apr. 20, 2004

(54) INFORMATION RECORDING APPARATUS FOR WRITABLE RECORDING MEDIA

(75) Inventor: Kazuo Kuroda, Tokorozawa (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 10/230,078

(22) Filed: Aug. 29, 2002

(65) Prior Publication Data

US 2003/0002408 A1 Jan. 2, 2003

Related U.S. Application Data

(62) Division of application No. 09/227,532, filed on Jan. 8, 1999, now Pat. No. 6,522,608.

(30) Foreign Application Priority Data

Jan. 14, 1998 (JP) ............................................. 10-6081

(51) Int. Cl.$^7$ ................................................. G11B 5/09
(52) U.S. Cl. .................................. 369/47.28; 369/53.34
(58) Field of Search ........................... 369/47.28, 47.3, 369/47.31, 47.15, 53.31, 53.34, 53.24, 53.44, 124.14, 124.08

(56) References Cited

U.S. PATENT DOCUMENTS

| 5,062,091 A | 10/1991 | Maeda et al. |
| 5,187,699 A | 2/1993 | Raaymakers et al. |
| 5,463,607 A | 10/1995 | Roth et al. ............... 369/47.54 |
| 5,815,472 A | 9/1998 | Kuroda et al. |
| 6,252,838 B1 | 6/2001 | Kuroda et al. ........... 369/47.28 |

FOREIGN PATENT DOCUMENTS

| EP | 0 384 405 A | 8/1990 |
| EP | 0 718 831 A | 6/1996 |
| EP | 0 800 172 A | 10/1997 |
| EP | 0 813 198 A | 12/1997 |
| EP | 0 872 830 A1 | 10/1998 |
| JP | 1-220183 | 9/1989 |
| JP | 2-223066 | 9/1990 |
| JP | 3-260958 | 11/1991 |
| JP | 4-356730 | 12/1992 |
| JP | 5-182356 | 7/1993 |
| JP | 5-303833 | 11/1993 |
| JP | 9-270171 | 10/1997 |
| JP | 9-284720 | 10/1997 |
| WO | WO 97/30439 A | 8/1997 |

Primary Examiner—Paul W. Huber
(74) Attorney, Agent, or Firm—Morgan, Lewis & Bockius LLP

(57) ABSTRACT

An information recording apparatus capable of smoothly reproducing in succession written data and data additionally written subsequent to the written data on a recording medium without disturbing a synchronization operation for read data during reproduction of information. The apparatus comprises a writing clock generating circuit for generating a writing clock signal for writing the new data into a recording medium while establishing synchronization with new data; a clock reproducing circuit for reading the written data from the recording medium, and reproducing a synchronization clock signal of the written data to generate a reproduced clock signal; and a phase adjusting circuit for synchronizing the phase of the writing clock signal with the phase of the reproduced clock signal.

9 Claims, 16 Drawing Sheets

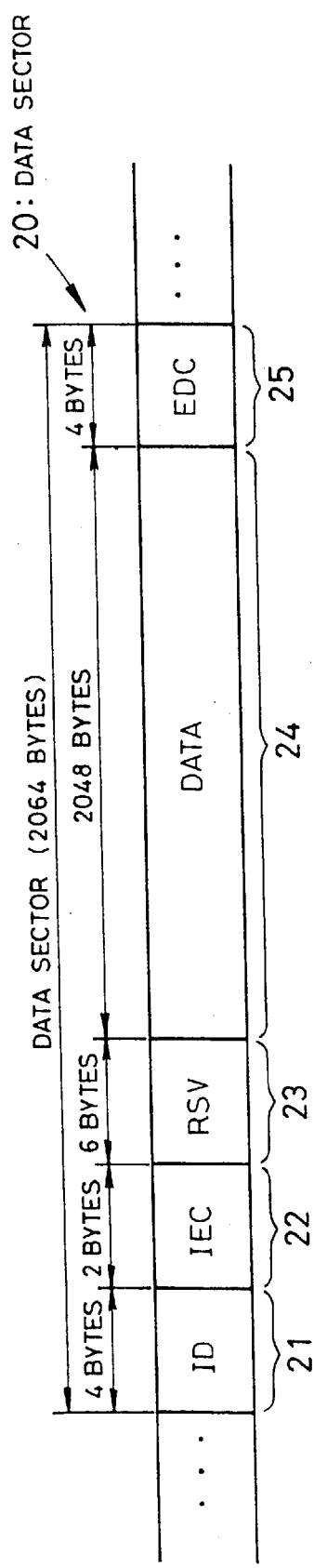

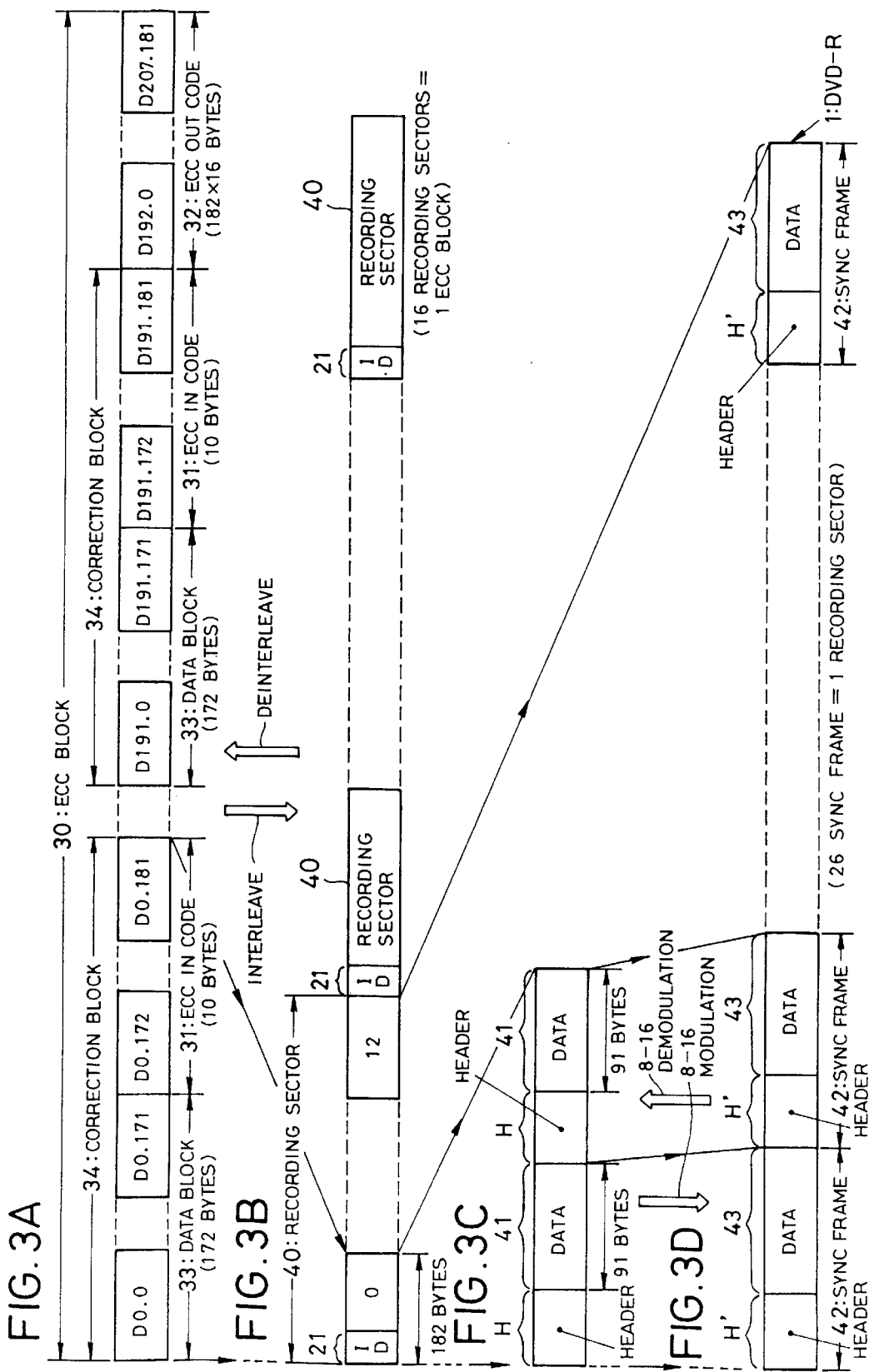

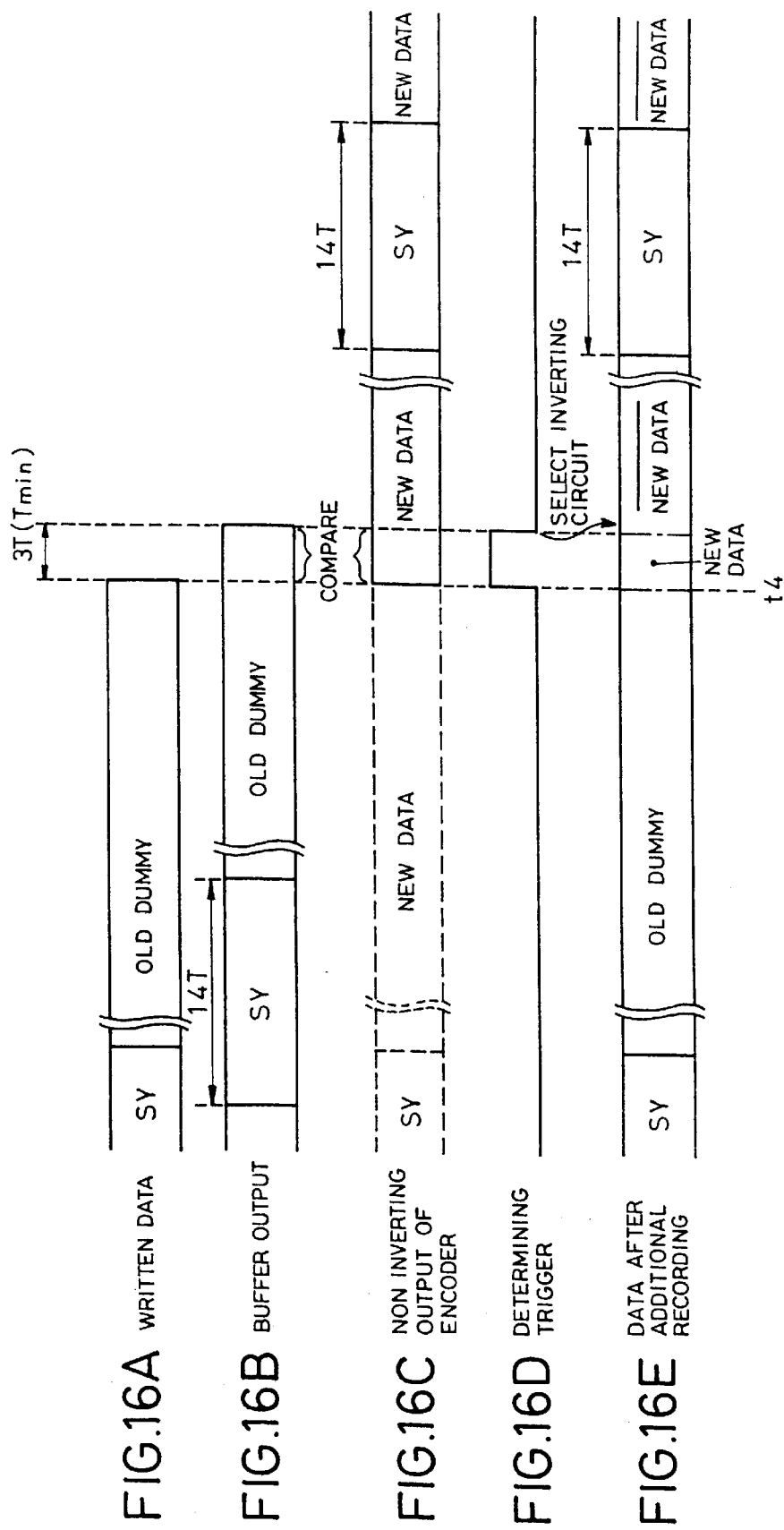

INFORMATION RECORDING APPARATUS FOR WRITABLE RECORDING MEDIA

This application is a divisional application of U.S. Ser. No. 09/227,532 filed Jan. 8, 1999, now U.S. Pat. No. 6,522,608.

BACKGROUND OF THE INVENTION

1. Field of the Invention

The present invention generally relates to an information recording apparatus, and more particularly to an information recording apparatus for recording information on an additionally writable recording medium such as a write once (WO) type optical disc on which information can be written only once at the same location or on a rewritable (RW) optical disc on which information can be rewritten any number of times at the same location.

2. Description of Related Art

In an information recording apparatus of the type mentioned above, when information data is written on an additionally writable recording medium, a writing clock signal is generated for writing the information data on the disc while establishing synchronization with the information data to be written. Stated another way, the information data is generally written on the disc in synchronism with the generated writing clock signal having a stable predetermined frequency (for example, so-called bit synchronization is established). The writing clock signal is typically generated from a reference clock generator, for example, a quartz oscillator or the like which can provide an oscillation output by itself.

However, when a write-once or additional write operation is performed on a disc, which has information data partially written thereon, for writing new information data subsequent to the written information data, a writing clock signal used for the written information data may differ in phase from a writing clock signal used for the new information data.

In this event, in an operation for reading the resulting disc after recording the new information data to sequentially reproduce the old and new information data, it is often difficult to reproduce clock signals for synchronizing the data read from the disc near the junction of the old and new information data.

Particularly, when information data is subsequently written on a disc on which information data has been written by an information recording apparatus using a different information recording apparatus, different writing clock signals are generated at respective recording times from different clock sources, even if these information recording apparatus belong to the same type, whereby preceding information data and subsequent information data are inevitably written with different writing clock signals having different frequencies as well as different phases.

Reproduction of a clock signal for synchronizing read data involves the use of a PLL (Phase Locked Loop) circuit which is supplied with the read data as an input. A disc having recorded thereon preceding and subsequent information data with writing clock signals largely different in phase and frequency from each other will significantly disturb the synchronization operation of the PLL circuit near the junction of the preceding data and the subsequent data. As a result, a decoder for decoding read data based on the clock signal for synchronizing read data may erroneously detect a variety of data in the read data.

Also, data is written on a disc in a format which includes a particular synchronization signal for each data block for carrying a predetermined amount of information in addition to the bit synchronization as mentioned above, such that an associated data block is synchronized during reproduction. Even such a particular synchronization signal is located in data based on the writing clock signal. Therefore, the writing clock signals largely different in phase and frequency from each other, generated as mentioned above, will cause the interval between a particular synchronization signal located at the end of the preceding information data and a particular synchronization signal located at the beginning of the subsequent information data to be largely different from intervals before and after that interval, possibly resulting in the inability of detecting the particular synchronization signal and erroneous detection during reproduction. Particularly, this would be a grave problem for a player having poor performance of detecting such a particular synchronization signal.

OBJECT AND SUMMARY OF THE INVENTION

Thus, the present invention has been made in view of the problem mentioned above, and its object is to provide an information recording apparatus which is capable of employing a recording form for a recording medium which permits written data and additional data written subsequent thereto to be smoothly reproduced in sequence without disturbing a synchronization operation for read data upon reproduction of information.

To achieve the above object, the present invention provides an information recording apparatus capable of additionally recording new data subsequent to previously written data on a recording medium, which comprises writing clock generating means for generating a writing clock signal for writing the new data into the recording medium while establishing synchronization with the new data, clock reproducing means for reading the written data from the recording medium, and reproducing a synchronization clock signal of the written data to generate a reproduced clock signal, and phase adjusting means for synchronizing the phase of the writing clock signal to the phase of the reproduced clock signal.

In the information recording apparatus mentioned above, the written data is data including a particular synchronization signal for every predetermined data block. The information recording apparatus may be configured to further comprise synchronization signal detecting means for detecting the particular synchronization signal from the written data, counting means responsive to detection timing of the particular synchronization signal by the synchronization signal detecting means to start a counting operation based on the reproduced clock signal, and control means for determining a writing start time at which the new data is written into the recording medium, based on a count value presented by the counting means.

In the information recording apparatus mentioned above, the phase adjusting means may synchronize the phase of the writing clock to the phase of a reproduced clock signal derived from the written data in a predetermined period before an additional recording start position for the new data on the recording medium.

Further, in the information recording apparatus mentioned above, the phase adjusting means, after synchronizing the phase of the writing clock signal to the phase of the reproduced clock signal, may be configured to return the writing clock signal to a frequency and a phase inherent to the writing clock generating means with a predetermined time constant.

The present invention also provides an information recording apparatus capable of additionally recording new data subsequent to previously written data on a recording medium, which comprises comparing means for comparing, in terms of value, an end data portion corresponding to a predetermined amount of data located at the end of the written data with a top data portion corresponding to the predetermined amount of data located at the beginning of the new data, and control means for changing values in the new data when the comparing means determines that values in the end data portion are coincident with values in the top data portion.

BRIEF DESCRIPTION OF THE DRAWINGS

FIG. 1 is a diagram showing the structure of a data sector of a DVD-R for carrying an original recording information;

FIGS. 3A to 3D are diagrams showing a physical format for data recorded on a DVD-R;

FIGS. 16A to 16E are time charts showing characteristic operational forms provided by the information recording apparatus of FIG. 15.

DETAILED DESCRIPTION OF THE PREFERRED EMBODIMENTS

Figures 2A, 2B:
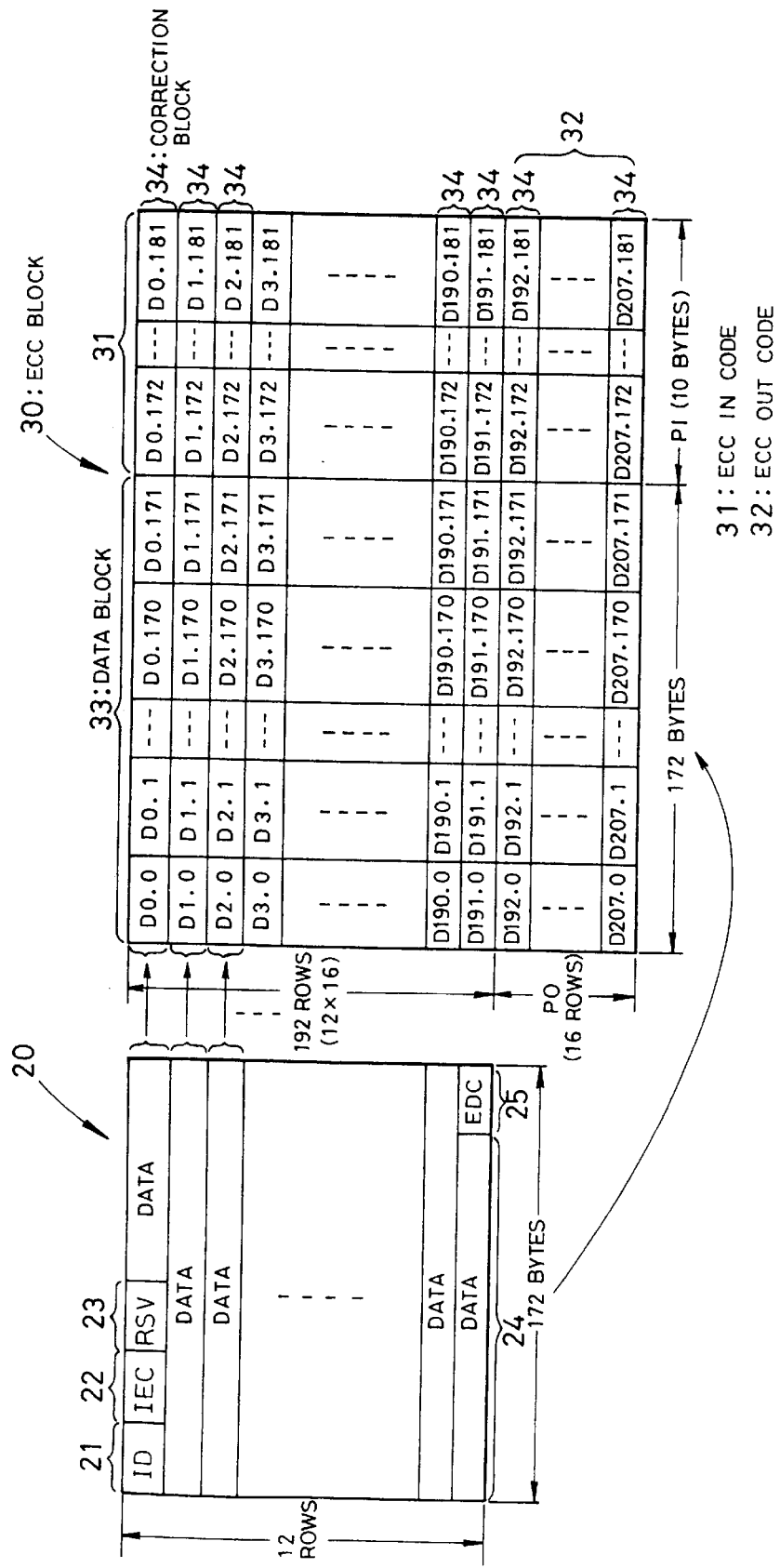
FIGS. 2A and 2B are diagrams showing the structure of an ECC block which is built using the data sector of FIG. 1.

Embodiments of the present invention will hereinafter be described in detail with reference to the accompanying drawings.

First, a general physical format for writing information into a DVD-R (Digital Video Disc-Recordable), as an additionally recordable recording medium, will be described with reference to FIGS. 1 to 3D.

Error correction processing performed for the DVD-R is based on an ECC (Error Correction code) block as its error unit. Such an ECC block is formed on he basis of a data sector shown in FIG. 1.

Original information recorded on the DVD-R is constituted by a physical structure including a plurality of data sectors 20 as shown in FIG. 1. The data sector 20 comprises, from its beginning, ID information 21 indicative of the starting position of the data sector 20; an ID information error correction code (IEC) 22 for correcting possible errors in the ID information 21; spare data 23; data 24 for carrying main information to be essentially recorded on an associated disc, such as video, audio or computer data and so on; and an error detection code (EDC) 25 for detecting possible errors in the data 24. These fields are arranged in this order to form block data. In the DVD-R, a plurality of the data sectors 20 are successively arranged to constitute original information which should be recorded thereon.

The data sector 20 as mentioned is used to build up the ECC block in the manner shown in FIGS. 2A, 2B.

First, as shown in FIG. 2A, one data sector 20 is divided into 172-byte data areas, and the divided data areas (hereinafter referred to as the "data block 33") are aligned in the vertical direction. This result in 12 rows of data blocks 33 aligned in the vertical direction.

Next, as shown in FIG. 2B, a 10-byte ECC IN code (PI(Parity In) code) 31 is assigned to each of the data blocks 33. The ECC IN code 31 is added to the end of each of the data blocks 33 to constitute a correction block 34. At this stage, 12 rows of correction blocks 34 including the ECC IN codes 31 are aligned in the vertical direction. Then, the addition of the ECC IN codes 31 as mentioned is repeated for 16 data sectors 20 to provide 192 rows of correction blocks 34.

Further, in FIG. 2B, the block data formed by 192 rows of vertically aligned correction blocks 34 as mentioned above is then vertically divided every one byte, and 16 ECC OUT codes (PO (Parity Out) code) 32 are added to the divided data. The ECC OUT code 32 is also added to the portion of ECC IN codes 31 within the correction block 34.

Consequently, one ECC block 30 including 16 data sectors 20 is formed. As is understood from the foregoing description, the total amount of information carried by one ECC block 30 is calculated by:

(172+10) bytes×(192+16) rows=37856 bytes

Within this amount of information, the information data 24 occupies:

2048 bytes×16=32768 bytes

In FIG. 2B, each one-byte data constituting the ECC block 30 is designated by a format "D#.*". For example, "D1.0" indicates one-byte data positioned in the first row and the $0^{th}$ column, and "D190.170" indicates one-byte data positioned in the $190^{th}$ row and the $170^{th}$ column. Therefore, the ECC IN codes 31 are positioned in the $172^{th}$ to $181^{th}$ columns, while the ECC OUT codes 32 are positioned in the $192^{th}$ to $207^{th}$ rows.

Further, since one correction block 34 is successively recorded on a DVD-R, the entire block may possibly be damaged by errors. However, as shown in FIG. 2B, the ECC block 30 is organized to include both the ECC IN codes 31 and the ECC OUT codes 32, so that horizontally aligned data in FIG. 2B can be corrected by the ECC IN codes 31, while vertically aligned data in FIG. 2B can be corrected by the ECC OUT codes 32. In this way, double error correction can be performed in the horizontal and vertical directions in the ECC block 30 shown in FIG. 2B, thereby providing more effective error correction as compared with error correction processing used in conventional CD (Compact Disk) or the like.

Describing in greater detail with this respect, for example, even if one correction block 34 (including a total of 182 bytes including one line portion of the ECC IN codes 31 as mentioned above and successively recorded on a DVD-R) is entirely destructed by external scratches or the like on a DVD-R, this is merely data destruction of only one byte for one column of ECC OUT codes 32, when viewed from the vertical direction. Therefore, even if one correction block 34 is entirely destructed, it can be correctly reproduced by performing the error correction using the ECC OUT codes 32 corresponding to the respective columns.

A specific recording sequence for recording the ECC block 30 as mentioned on a DVD-R is shown in FIGS. 3A to 3D. It should be noted that in FIGS. 3A to 3D, one byte data designated by "D#. *" is the same as that designated in the same manner in FIG. 2B.

First, the ECC block 30 is aligned in a horizontal direction in a line for each correction block 34, as shown in FIG. 3A, and interleaved. As shown in FIG. 3B, the ECC block 30 is transformed into 16 recording sectors 40 by the interleaving. In this transformation, one recording sector 40 includes 2366 bytes (37856 bytes/16) of information in which the data sectors 20 and the ECC IN codes 31 or the ECC OUT codes 32 are mixed. However, each recording sector 40 has the ID information 21 (see FIG. 1) in the data sector 20 positioned at the top thereof.

The recording sector 40 as shown in FIG. 3C is divided into 91-byte data 41, and a header H is added to each of the 91-byte data 41. Subsequently, the recording sector 40 with the headers added thereto is 8–16 modulated, and transformed into sync frames 42 for every data 41 and a header associated therewith, as shown in FIG. 3D. After the transformation, each sync frame 42 is composed of a header H' and data 43.

Also, one sync frame 43 has the amount of information calculated by:

91 bytes×8×(16/8)=1456 channel bits (note that the amount of information is 1488 channel bits when including synch information)

This synch frame 42 is written into a DVD-R in a successive form. In this event, one recording sector 40 includes 26 sync frames 42.

When information has been recorded on a DVD-R in accordance with the physical format described above, the original ECC block can be recovered by performing 8–16 demodulation and deinterleaving on the information upon reproduction (see FIG. 3A), and the information can be correctly reproduced after the effective error correction is conducted thereon as described above.

As a result, information is recorded on a DVD-R in the form of sync frame sequence as shown in FIG. 3D, wherein the information is recorded on previously defined tracks on the DVD-R.

Figure 4:
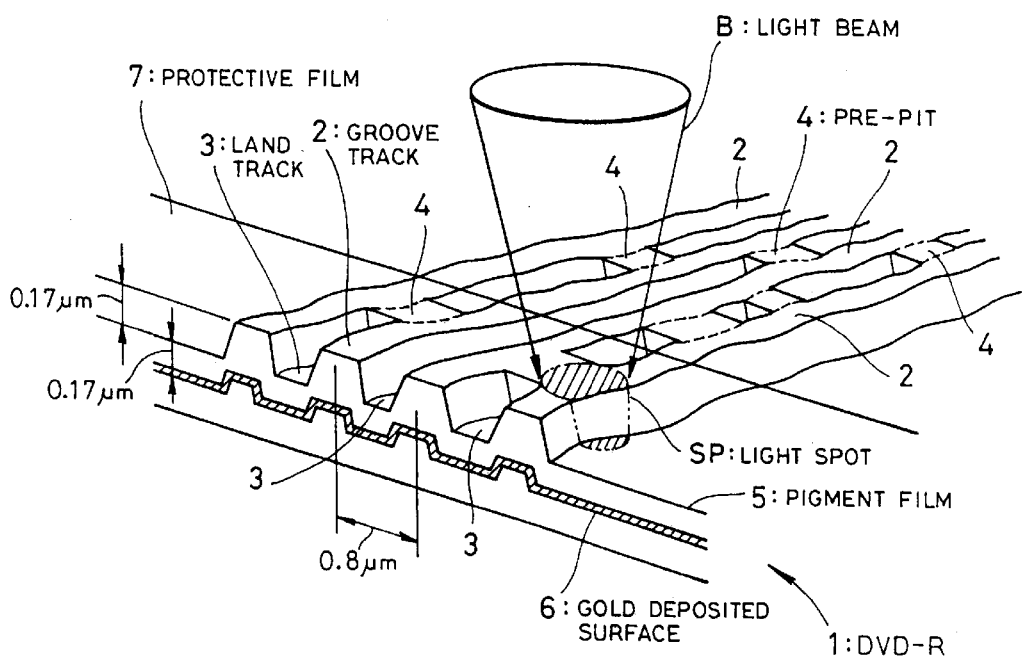
FIG. 4 is a perspective view illustrating the structure of a recording layer of the DVD-R.

FIG. 4 illustrates the structure of a recording layer of a DVD-R including tracks which serve as positions at which the information as mentioned is recorded.

Referring specifically to FIG. 4, a DVD-R 1 is formed with groove tracks 2 on which a pigment film 5 is formed and information in the sync frame sequence can be written; and land tracks 3 positioned adjacent to the groove tracks 2 for guiding a laser beam B to the associated groove tracks 2 as reading light or writing (recording) light. The groove tracks 2 are formed in concave, viewed from the source of the laser beam B, while the land tracks 3 are formed in convex viewed from the source so as to carry a gold deposited surface 6 as a light reflecting surface for reflecting off the beam B.

Each of the groove tracks 2 is undulated in a direction parallel to the flat surface of the disc at a predetermined frequency (for example, a frequency corresponding to a proper rotating speed of the disc). In other words, so-called wobbling is applied to the groove tracks 2. With the use of such wobbling, the rotation of the disc can be controlled when information is read therefrom.

Each of the land tracks 3 is formed with pre-pits 4 for carrying recording control information such as address information indicative of a recording position on the DVD-R 1, timing control information for controlling recording timing, and so on.

The wobbling and pre-pits 4 as well as the groove tracks 2 and the land tracks 3 are pre-formed when the DVD-R 1 is fabricated. Additionally, the wobbling and the pre-pits 4 function as preformed recording information which has previously been formed (recorded) before information is written for the first time.

When information is recorded on the DVD-R 1 having the structure as described above, the DVD-R 1 is irradiated with a light beam B such that the center of the light beam B matches the center of a groove track 2 to form pits corresponding to the sync frame sequence on the groove track 2. In this event, a spot SP of the light beam B is sized such that a portion of the spot SP is also irradiated to the land track 3, as illustrated in FIG. 4. A portion of reflected light of the light spot SP irradiated to the land track 3 is used to detect the pre-pits 4 through a push-pull method, thus acquiring preformed recording information inherent to the disc indicated by the pre-pits. The reflected light of the light spot SP irradiated to the groove track 2 is further used to detect a wobble signal in accordance with the wobbling of the groove track 2 to control the DVD-R1 for rotation based on the detected wobble signal.

Figure 5:
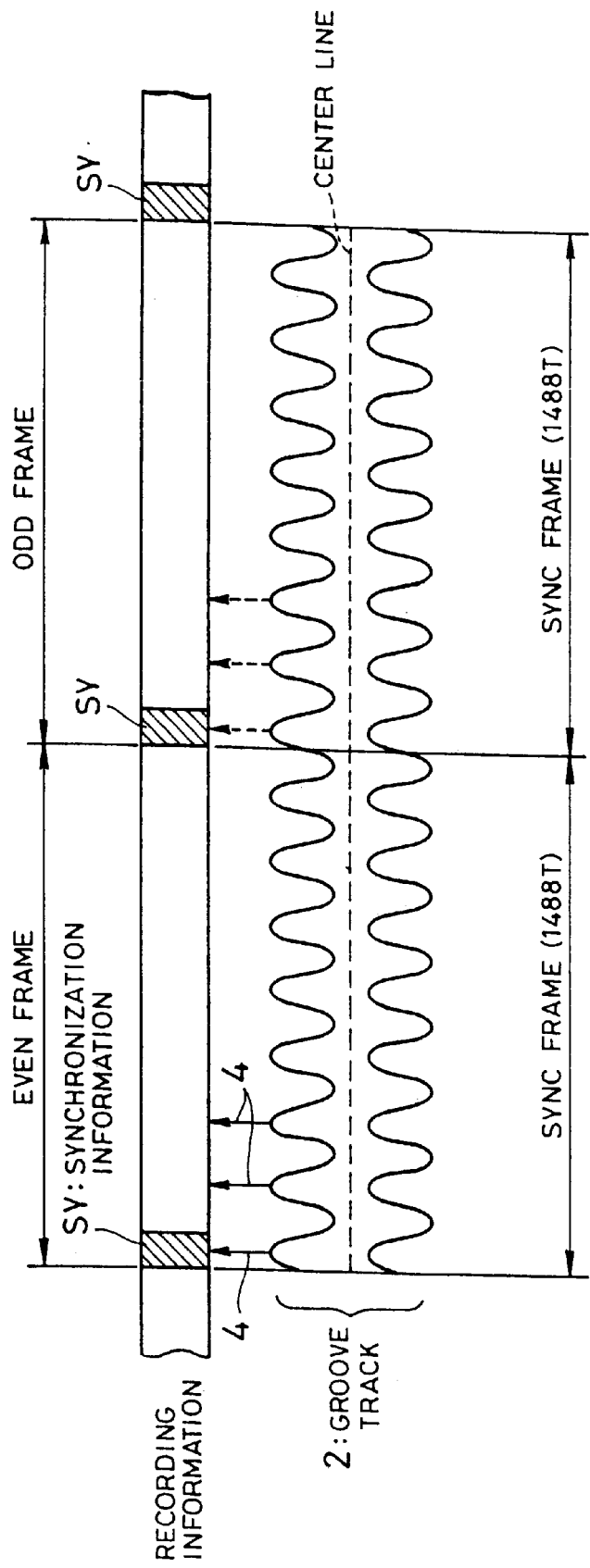
FIG. 5 is a schematic diagram representing a correspondence relationship between grove tracks, data of a synch frame sequence written thereon, and pre-pits formed in a land track in a DVD-R.

The groove track 2, data in a sync frame sequence to be written into the groove track 2, and pre-pits (hereinafter referred to as the "LPP" (Land Pre Pit)) 4 formed in the land track 3 are placed in a correspondence relationship as represented in FIG. 5.

As shown in FIG. 5, data in the sync frame sequence, which is information to be recorded, is recorded on the groove track 2 along a center line thereof. This recording is controlled so as to record one sync frame for every eight wobbling periods exhibited by the groove track 2. A wobbling frequency is constantly set at 140 kHz (value converted from the proper reading rate) over all sync frames.

The sync frame has the header H' positioned at the top thereof, as described in conjunction with FIG. 3D. The header H' in turn is assigned a synchronization signal SY at the leading end. The synchronization signal SY is provided for establishing synchronization of the sync frame, and has identical waveform symbols over a length of 14T. Here, T corresponds to a bit interval in the data sequence before the 8–16 modulation, as shown in FIG. 3C. A sync frame has a length of 1488T.

The LPPs 4, on the other hand, are formed at positions corresponding to upward arrows in FIG. 5. Specifically, in FIG. 5, the LPPs 4 may be formed in land tracks 3 adjacent to three positions corresponding to peeks or valleys of the waves exhibited by the wobbling of the groove track 2, counted from the top of the sync frame. However, in one recording sector (see FIG. 3B), the LPPs 4 are formed only in even-numbered sync frames (EVEN frames) or in odd-numbered sync frames (ODD frames). FIG. 5 shows the case where LPPs 4 are formed only in EVEN frames, so that they are not formed at positions corresponding to upward dotted arrows. The LPP 4 positioned closest to the top of a sync frame is provided for synchronization, so that it is formed without fail corresponding to a determined even- or odd-numbered frame. The LPP 4 for synchronization carries address information on a recording surface of the DVD-R, and the address information is identified in units of recording sectors.

As can be seen also from FIG. 5, the LPPs 4 are formed at positions substantially corresponding to the position at which the synchronization signal SY is recorded within sync frame data written into the groove track 2.

The information recording apparatus according to this embodiment is capable of handing a DVD-R which is formed with the previously recorded information in the manner mentioned above and on which data in sync frame sequences is written. Details on the information recording apparatus will be described below.

Figure 6:
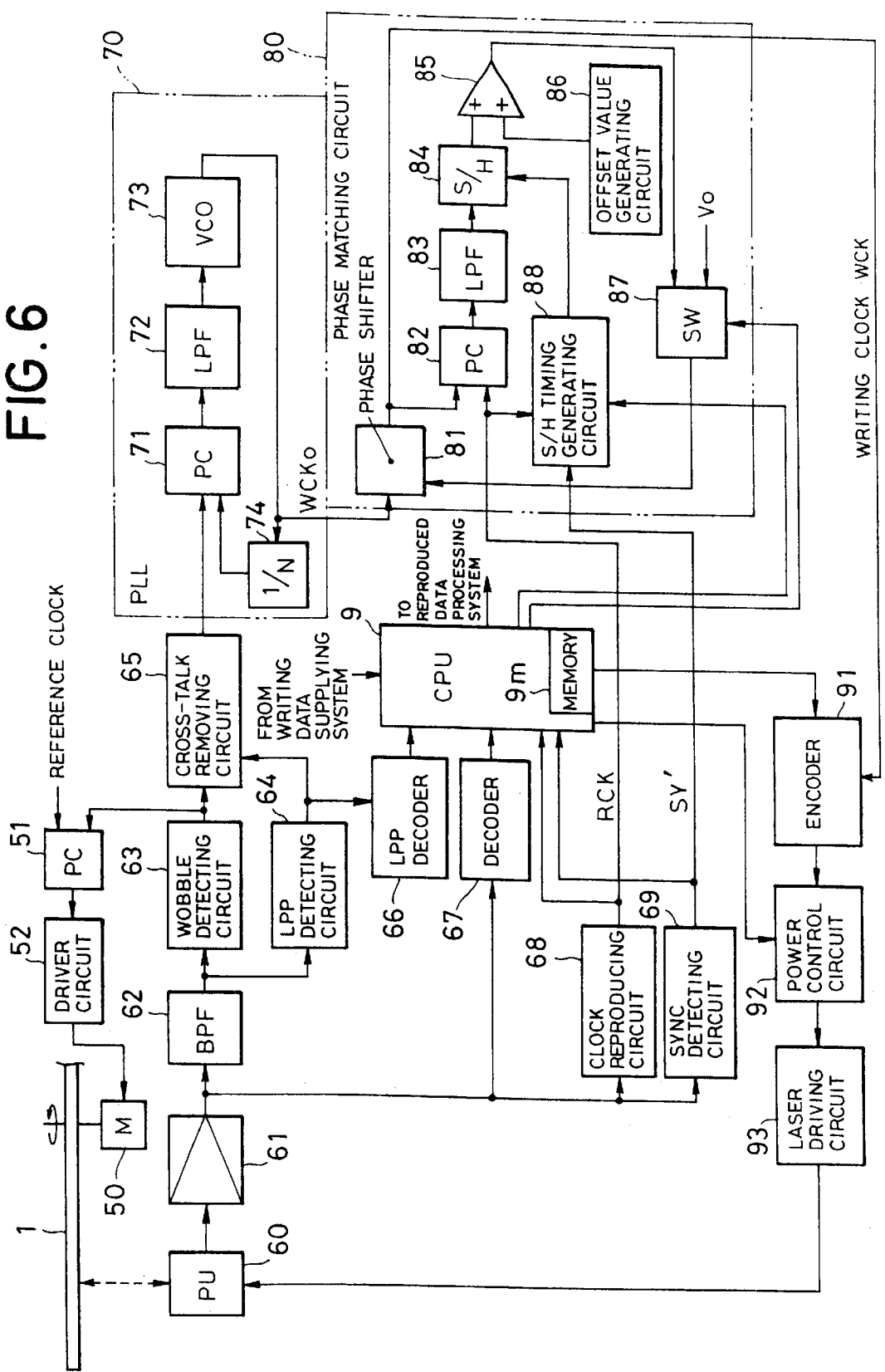
FIG. 6 is a block diagram illustrating a general configuration of an information recording apparatus according to a first embodiment of the present invention.

FIG. 6 illustrates a general configuration of the information recording apparatus according to this embodiment.

Referring specifically to FIG. 6, a DVD-R 1 (hereinafter simply referred to the "disc"), while rotated by a spindle motor 50, is irradiated with a laser beam from a pickup 60 serving as an optical head capable of outputting laser light both at a reading light level and at a writing light level. The laser light incident on the disc reaches a reflecting surface (see FIG. 4) of the disc, and reflects off the reflecting surface as reflected light in accordance with recorded information, which is then guided to the pickup 60.

The pickup 60, which incorporates an opto-electrical transducing circuit including a light receiving element, receives the reflected light from the disc, and opto-electrically transduces the received light in accordance with its received light level and condition. The opto-electrically transduced output is supplied to a reproducing amplifier 61 as a read signal.

The reproducing amplifier 61 amplifies the read signal supplied thereto, and supplies the amplified read signal to a wobble detecting circuit 63 and an LPP (pre-pit) detecting circuit 64 through a bandpass filter (BPF) 62.

The wobble detecting circuit 63 detects or extracts the wobble signal from the read signal, and supplies it to one input of a cross-talk removing circuit 65. The LPP detecting circuit 64 detects the pre-pits 4 from the read signal, and generates a pre-pit signal in accordance with the detection result. The pre-pit signal is supplied to the other input of the cross-talk removing circuit 65 as well as to a pre-pit (LPP) decoder 66.

The cross-talk removing circuit 65 has a function of removing a jitter component included in the wobble signal due to cross-talk based on the pre-pit signal, and supplies the jitter free wobble signal to a PLL circuit 70 for generating a wobble synchronization clock. The resulting wobble signal will have an accuracy depending upon a detection accuracy for the pre-pit signal based on residual errors which cannot be completely eliminated on the time base by a time base servo such as a spindle servo or the like. In other words, the resulting wobble signal includes an error (approximately ±5T) of the pre-pit signal due to the residual errors.

The PLL circuit 70 comprises a phase comparator 71 for comparing the cross-talk removed wobble signal received at the one input with another input signal received at the other input in terms of phase to output an error signal corresponding to a difference in phase between the two signals; a low pass filter (LPF) 72 for passing therethrough a low frequency component of the error signal; a VCO 73 for changing an oscillating frequency in response to the output of the filter 72; and a frequency divider 74 for dividing an oscillation output clock signal of the VCO 73 to generate a signal at a frequency equivalent to that of the wobble signal and for supplying the generated clock signal to the other input of the phase comparator 71. The output clock signal of the VCO 73 serves as the basis of a writing clock, and is supplied to a phase matching circuit 80 as an original writing clock signal WCKO which is synchronized in phase with the output of the PLL circuit 70, i.e., the wobble signal. The PLL circuit 70 corresponds to a writing clock generating means.

The amplified read signal from the reproduction amplifier 61 is also supplied to a main data decoder 67, a bit clock reproducing circuit 68, and a sync detecting circuit 69.

The main data decoder 67 performs data processing such as 8–16 demodulation and deinterleaving on the read signal, and also performs the processing for recovering data 24 while conducting the error correction processing from ECC blocks (see FIGS. 1 to 3D), and transfers recovered data to a CPU 9. The CPU 9 sends the recovered data transferred thereto to a reproduced data processing system, not shown, for providing an actual audio output, video output, or data output. The LPP decoder 66, on the other hand, detects address information indicative of a recording position on the recording surface of the disc, and sync frame synchronization information from the detected pre-pit signal, and sends them to the CPU 9. The CPU 9 utilizes addresses based on this pre-pit signal and the sync frame synchronization information for performing a variety of processing.

The clock reproducing circuit 68, which reproduces a bit synchronization clock (having a period T) for data carried on the read signal, supplies its output to the CPU 9 and the phase matching circuit 80 as a reproduced clock RCK.

The sync detecting circuit 69 detects the synchronization signal SY (see FIG. 5) as a particular synchronization signal included in the read signal. The sync detecting circuit 69 generates, for example, a pulsative sync detecting signal SY' in response to detection of the synchronization signal SY. The sync detecting signal is supplied to the CPU 9 and the phase matching circuit 80.

The phase matching circuit 80 comprises a phase shifter 81 capable of shifting the phase of the original writing clock signal WCKO which is synchronized in phase with the wobble signal from the PLL circuit 70; a phase comparator 82 for comparing an output signal of the phase shifter 81 received at one input thereof with the reproduced clock signal RCK from the clock reproducing circuit 68 received at the other input thereof to output an error signal corresponding to a difference in phase between the two signals; a low pass filter (LPF) 83 for passing therethrough a low frequency component of the error signal; a sample and hold (S/H) circuit 84 for sampling and holding the value of the output signal from the LPF 83 in response to a sample/hold timing signal; an adder 85 for adding the value of an output signal from the sample and hold circuit 84 and an offset value; an offset value generating circuit 86 for supplying the adder 85 with a predetermined offset value; a loop switch 87 for receiving an addition output of the adder 85 at one input and a reference signal V0 corresponding to a phase shift amount in a normal state of the phase shifter 81 as the other input to selectively output one of these two inputs to the phase shifter 81 in accordance with a loop control signal from the CPU 9; and an S/H timing generating circuit 88 for generating the sample/hold (S/H) timing signal to the S/H circuit 84 based on the output reproduced clock signal of the clock reproducing circuit 68, the output sync detecting signal of the sync detecting circuit 69, and a control signal from the CPU 9. The phase matching circuit 80 serves as a phase adjusting means.

In the phase matching circuit 80, when the CPU 9 generates a loop control signal to the loop switch 87 to select the output of the adder 85 (for closing the loop), a phase error between a phase shifted writing clock signal WCK and the reproduced clock signal RCK is produced from the phase comparator 82, and sampled values of the phase error are produced by the sample and hold circuit 84. Then, the adder 85 supplies the phase shifter 81 with a feedback signal in accordance with the addition value of the sample value and the offset value through the switch 87. Here, the feedback signal supplied to the phase shifter 81 sets in the phase shifter 81 a phase shift amount corresponding to the phase error, more specifically, the amount of phase shift (a value indicating to which extent the phase should be shifted) that converges the addition value of the phase error value and the offset value to zero.

Thus, with a feedback control performed by a loop formed of the foregoing phase shifter 81, phase comparator 82, LPF 83, S/H circuit 84, adder 85 and offset value generating circuit 86, and loop switch 87, the phase of the writing clock signal WCK is gradually brought, from the time the loop is closed, to match a phase which is the sum of the phase of the reproduced clock signal RCK from the clock reproducing circuit 68 and the offset value. The writing clock signal WCK having the phase matched in this way is derived from the phase shifter 81, and supplied to an encoder 91 forming part of an information recording system as a bit clock for code conversion. The offset employed herein is preferably a value that corresponds to a time period from the irradiation of a writing beam onto the disc to the actual formation of recording marks. In this way, the data can be written in conformity to the recording characteristics of the disc.

On the other had, when the CPU 9 generates a loop control signal to the loop switch 87 to select the reference signal V0 (for opening the loop), a phase shift amount corresponding to the reference signal V0 is set in the phase shifter 81, so that the phase shifter 81 shifts the phase of the original writing clock signal WCKO by the set phase shift amount to generate the writing clock signal WCK. Therefore, when the loop is open, the writing signal WCK is generated with its phase adjusted as determined by the reference signal V0 without relying on the reproduced clock.

Details on the S/H timing generating circuit 88 will be described later.

The encoder 91 performs final stage encoding for data to be written into the disc, transferred from the CPU 9. Here, a code conversion is performed for executing the 8–16 modulation as referred to the aforementioned FIGS. 3A to 3D. The CPU 9 receives an original signal of data to be written from a writing data supply system, not shown, and performs data processing other than the 8–16 modulation processing on the original signal. More specifically, the CPU 9 adds the aforementioned ECC IN codes 31 and the ECC OUT codes 32 to the original signal to form ECC blocks 30, and interleaves the ECC blocks 30 to generate data to be transferred to the encoder 91. Such transfer of the data involves the use of a built-in memory 9m. The data to be transferred is once stored in the memory 9m, and sequentially read at predetermined timing determined by the CPU 9. The data finally encoded by the encoder 91 is sent to a power control circuit 92.

The power control circuit 92 generates a control signal for specifying the laser power in accordance with the encoded data sent thereto from the encoder 91 in a writing mode, and a laser driving circuit 93 generates a driving signal at a level corresponding to an actual source laser of the pickup 60 in response to the control signal. In this way, the intensity of the recording (writing) laser light irradiated from the pickup 60 to the disc is varied corresponding to the encoded data. In a reading mode, on the other hand, the power control circuit 92 does not respond to the encoded data sent thereto from the encoder 91, but generates a control signal for specifying low level and substantially constant laser power for reading. Then, the laser driving circuit 93 generates a driving signal at a level corresponding to the actual source laser of the pickup 60 in response to the control signal. In this way, the disc is read with the reading laser light irradiated from the pickup 60 at a constant low level.

The output wobble signal from the wobble detecting circuit 63 is also used for controlling the rotation of the disc, as previously mentioned. Specifically, the wobble signal is supplied to one input of a phase comparator 51, the other input of which receives a reference clock signal supplied from a local oscillator, not shown. The phase comparator 51 produces a frequency error and a phase error between the two inputs, and supplies a spindle control signal in accordance with these errors to a driver circuit 52 which in turn generates a driving signal for a motor 50 in accordance with the spindle control signal. In this way, the rotation of the motor 50 is controlled such that the frequency of the wobble signal detected from the read signal is coincident with the frequency of the reference clock signal.

Next, the operation of the information recording apparatus according to this embodiment will be described.

FIGS. 7A to 7J are time charts showing operational waveforms and operational forms at respective portions of the information recording apparatus illustrated in FIG. 6 which is in an additional recording mode where data (hereinafter referred to as the "new data") is additionally written subsequent to a sequence of written data (hereinafter referred to as the "old data") which has previously been written into a disc.

Figure 7:
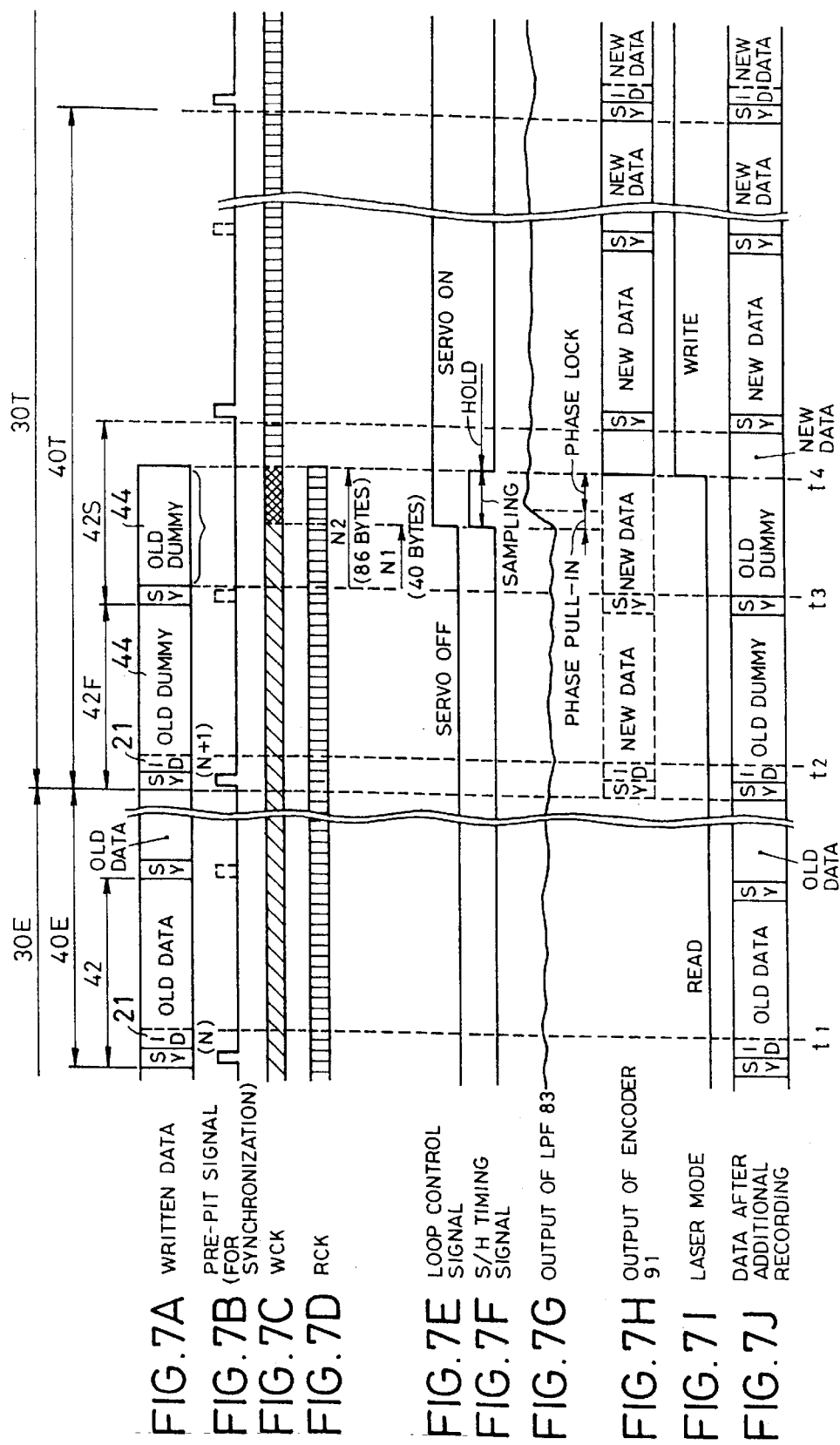
FIGS. 7A to 7J are time charts showing operational waveforms and operational forms at respective portions in the information recording apparatus of FIG. 6.

In this embodiment, as shown in FIG. 7A, when the old data has been written, dummy data (hereinafter referred to as the "old dummy data") 44 corresponding to an entire data portion of a first sync frame 42F and a 86-byte portion of data in a second sync frame 42S in the top recording sector 40T of an ECC block 30T, which should be located next to a final ECC block 30E of the old data, is recorded subsequent to the old data together with sync information SY and ID information 21 corresponding thereto.

Figure 8:
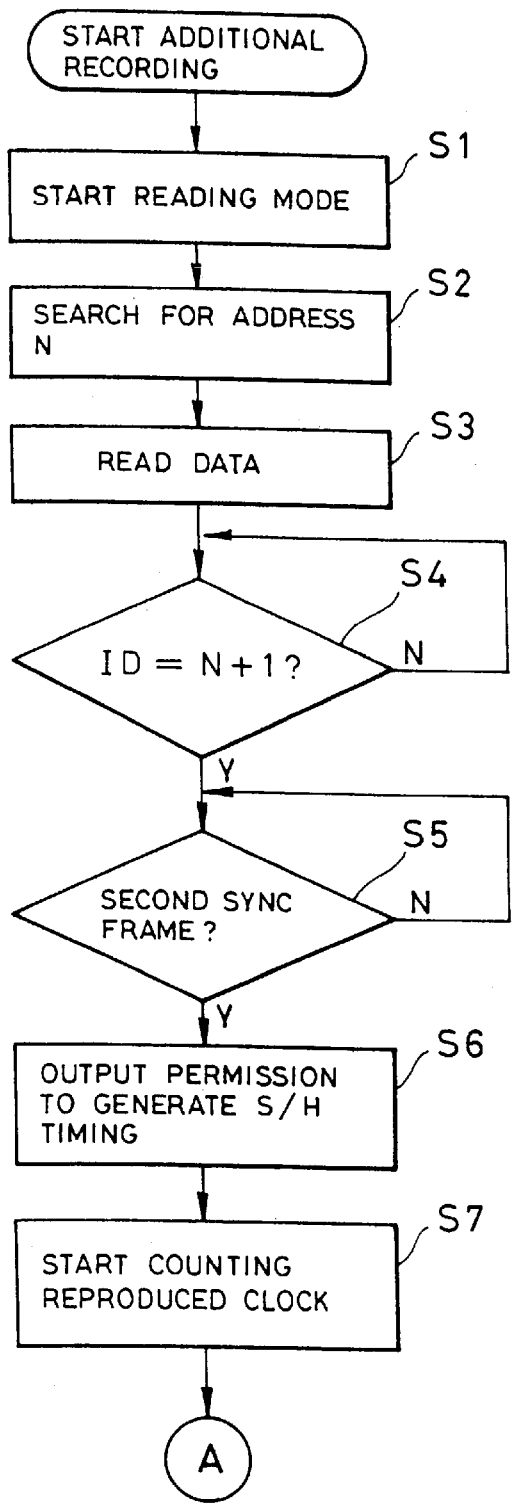
FIG. 8 is a flow chart illustrating the former half of a procedure for additional recording processing executed by a CPU in the information recording apparatus of FIG. 6.
Figure 9:
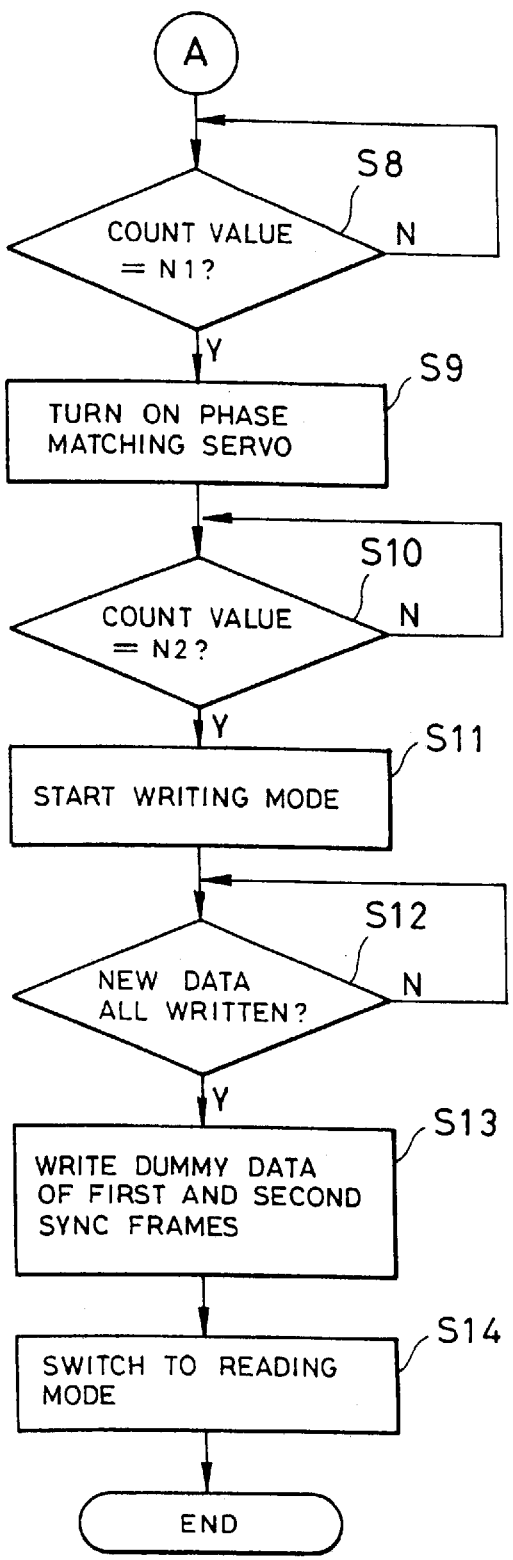
FIG. 9 is a flow chart illustrating the latter half of the procedure for the additional recording processing executed by the CPU in the information recording apparatus of FIG. 6.

When an additional recording start instruction is issued from an instructing means, not shown, for the disc on which the old data has been written in the manner as mentioned, the CPU 9 executes additional recording processing as illustrated in FIGS. 8 and 9.

Specifically, the CPU 9 first starts a reading mode in response to the additional recording start instruction (step S1). In this processing, the CPU 9 controls the power control circuit 92 such that the intensity of the light irradiated from the pickup 60 to the disc 1 is at such a relatively low constant reading light level that does not cause a writing action on the recording surface of the disc 1, without responding to input data from the encoder 91.

Next, the CPU 9 searches for an address N corresponding to ID information 21 in order to retrieve the ID information 21 on the top side of a recording sector 40E in which last one of the old data is recorded (step S2). This processing is executed on the basis of an output signal of the decoder 67.

It is assumed herein that the address indicated by the ID information 21 located on the top side of the final recording sector 40E in the final ECC block 30E within the old data is the address N, and the address indicated by the ID information 21 located at the beginning of the recording sector 40T, in which the old dummy data 44 is recorded subsequent thereto, is the address (N+1).

When the ID information 21 corresponding to the address N is detected (see time t1 in FIGS. 7A to 7J), the CPU 9 starts reading data recorded in the recording sector 40E subsequent to the ID information 21 corresponding to the address N and data in the recording sector 40T subsequent thereto (step S3).

Then, the CPU 9 determines based on a modulated output of read data, i.e., an output signal of the decoder 67 whether or not the ID information 21 corresponding to the address (N+1) has been detected (step S4). If the ID information 21 corresponding to the address (N+1) has not been detected at step S4, the CPU 9 continues to read data until it is detected.

When the ID information 21 corresponding to the address (N+1) has been detect at step S4 (see time t2 in FIGS. 7A to 7J), the CPU 9 searches for a second sync frame 42S in the recording sector 40T corresponding to the ID information 21 corresponding to the address (N+1), and proceeds to make a search based on acquired read data (step S5). More specifically, the CPU 9 receives from the sync detecting circuit 69 a detection signal SY' for the synchronization signal SY at the beginning of the second sync frame 42S after the detection of the ID information 21 corresponding to the address (N+1), and detects the arrival of the second sync frame 42S with the receiving timing.

When the second sync frame 42S is thus detected (see time t3 in FIGS. 7A to 7J), the CPU 9 issues a permission instructing signal to the S/H timing generating circuit 88 for permitting the same to supply the S/H timing signal to the S/H circuit 84 (step S6). The CPU 9 also starts counting the reproduced clock from the clock reproducing circuit 68 in response to the detection of the second sync frame 42S (step S7).

Figure 10:
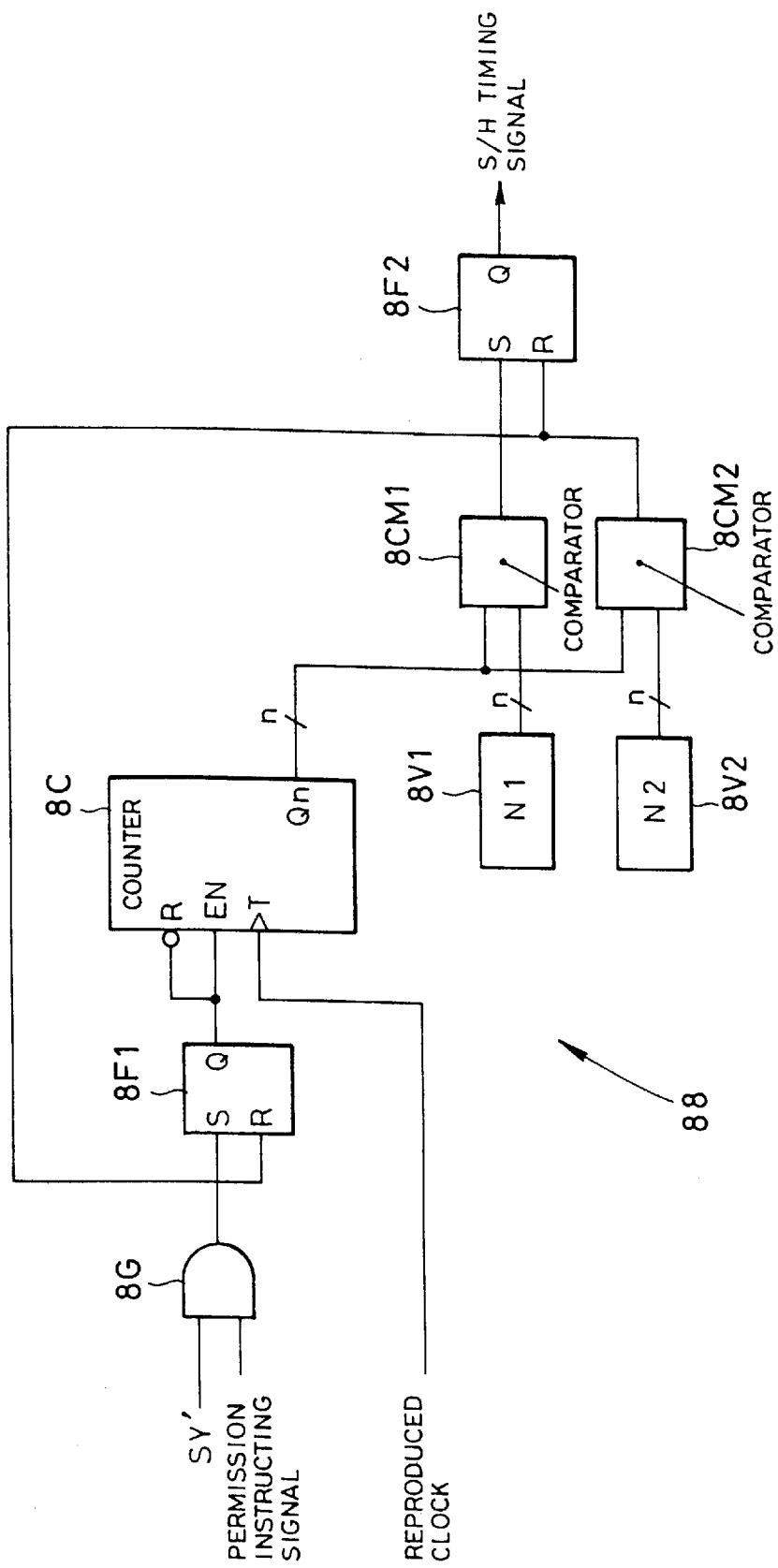
FIG. 10 is a block diagram illustrating an example of a specific configuration of an S/H timing generating circuit in the information recording apparatus of FIG. 6.

The S/H timing generating circuit 88 is configured, for example, as illustrated in FIG. 10.

Referring specifically to FIG. 10, the S/H timing generating circuit 88 comprises an AND circuit 8G which receives the permission instructing signal and a sync detecting signal SY' from the sync detecting circuit 69 as inputs; an SR flip-flop 8F1 which receives an output signal of the AND circuit 8G as a set input; a counter 8C which receives a Q output signal of the SR flip-flop 8F1 as an inverting reset input and an enable input, and the reproduced clock from the clock reproducing circuit 68 as a trigger input; a first comparator 8CM1 for determining whether a count value of the counter 8C matches a predetermined first count value; a second comparator 8CM2 for determining whether the count value of the counter 8C matches a predetermine second count value to supply its matching determination output to a reset input of the flip-flop 8F1; and an SR flip-flop 8F2 which receives a matching determination output of the first comparator 8CM1 as a set input and the matching determination output of the second comparator 8CM2 as a reset input. The SR flip-flop 8F2 generates an S/H timing signal from a Q output to the S/H circuit 84.

In the foregoing configuration, the AND circuit 8G generates a high-level signal when the permission instructing signal and the sync detecting signal SY' both become significant, and the flip-flop 8F1 is set in response to the high-level signal. This leads to the counter 8C released from a reset state to enter a countable state for counting the reproduced clock. Thus, the counter 8C starts its counting operation in response to the permission instructing signal and the sync detecting signal SY' both becoming significant. The comparator 8CM1 detects that a count output of the counter 8C has reached the first count value N1, and brings the flip-flop 8F2 in a set state. As the counter 8C subsequently goes counting, the comparator 8CM2 detects that the count output has reached the second count value N2 and brings the flip-flop 8F2 in a reset state. In this way, the flip-flop 8F2 raises the S/H timing signal at the first count value N1 and falls the same at the second count value N2.

Thus, the SR flip-flop 8F2 generates from the Q output the S/H timing signal which has the waveform as shown in FIG. 7F.

As shown in FIGS. 7D, 7E, the first count value N1 is chosen to be a value corresponding to, for example, 40 bytes of the old dummy data in the second sync frame 42S, while the second count value N2 is chosen to be a value corresponding to 86 bytes of the old dummy data in the second sync frame 42S, and the difference between the two count values is set to 46 bytes corresponding to substantially one half of one sync frame. Stated another way, the timing at which the counter 8C reaches the first count value N1 corresponds to the time at which 40 bytes of the old dummy data in the second sync frame 42S have been read, and the timing at which the counter 8C reaches the second count value N2 corresponds to the time at which 86 bytes of the old dummy data in the second sync frame 42S have been read, so that a period in which the S/H timing signal maintains the high level corresponds to 46 bytes of the old dummy data. It should be noted however that the first and second count values N1, N2 and the difference therebetween are not limited to the values mentioned above, but may be changed to any appropriate different values. As an embodiment which can change these values, memories 8V1, 8V2 may be used for storing these predetermined count values in such a manner that they can be changed as appropriate.

On the other hand, the CPU 9 also functions as a counting means and starts counting the reproduced clock from the clock reproducing circuit 68 in response to the detection of the second sync frame 42S, and determines whether or not the count value from the start of the count has reached the first count value N1 (step S8). If the count value has reached the first count value N1, the CPU 9 raises the loop control signal as shown in FIG. 7E, and forces the switch 87 to close the servo loop of the phase matching circuit 80 (step S9). This loop closing timing corresponds to the timing of a rising edge of the S/H timing signal.

Subsequently, the CPU 9 continues its counting operation, and determines whether or not the count value has reached the second value N2 (step S10). If determining that the CPU 9 has counted up to the second count value N2 (see time t4 in FIGS. 7A to 7J), the CPU 9 functions as a control means and starts a writing mode (step S11). In this processing, the CPU 9 controls the power control circuit 92 in accordance with input data from the encoder 91 to enter a record mode in which the intensity of the light irradiated from the pickup 60 to the disc 1 is changed between a writing light level which causes a writing action on the recording surface of the disc and a reading light level which does not cause such action.

In this way, data at and subsequent to the $87^{th}$ bytes in the second sync frame 42S, as indicated by solid lines in FIG. 7H, within the output data of the encoder 91 are fetched into the power control circuit 92 and recorded on the disc 1. The output data of the encoder 91 indicated by dotted lines in FIG. 7H indicate that they are not reflected to the output of the power control circuit 92 even though they have been transferred to the power control circuit 92, since the reading mode has been set. It should be noted that the light irradiated from the pickup 60 is continuously set at reproducing power even when no data is written into the disc because reflected light for tracking servo control is required to track an information recording track (groove track) on the disc.

Consequently, after the writing of new data has been started, the CPU 9 determines whether or not the new data to be essentially transferred to the encoder 91 have been terminated (step S12). If not terminated, the CPU 9 continues to still record the new data. Conversely, if terminated, the CPU 9 stores dummy data 44 corresponding to all data in a first sync frame and 86 bytes of data in a second sync frame in the top recording sector 40 of the ECC block 33 to be located next to the last ECC block 30 of the just recorded data, subsequent to that data together with sync information SY and ID information 21 corresponding thereto (step S13), as the final processing required at the end of the recording. This processing is similar to the processing performed when the aforementioned old data has been recorded.

When the writing operations associated with all the new data including the additional recording operation at the end of recording have been completed at step S13, the CPU 9 controls the power control circuit 92 such that the intensity of the light irradiated from the pickup 60 to the disc 1 is changed to a constant reading light level, without responding to input data from the encoder 91, to switch to the reading mode (step S14). The processing for additionally recording the new data is terminated in this way.

As described above, the loop control signal is raised and the S/H timing signal is generated immediately before new data is written. The S/H circuit 84 operates to perform sampling, i.e., to fetch an error signal from the LPF 83 and transmits the error signal to the adder 85 while the S/H timing signal is at high level. In this event, the CPU 9 raises the loop control signal to control the switch 87 to relay the output of the adder 85 to the phase shifter 81, so that the amount of phase shift corresponding to the error signal is specified for the phase shifter 81 over a high-level period of the S/H timing signal.

Thus, while the S/H timing signal is at high level, a feedback control is performed for the phase matching circuit 80, in a direction in which an output error level of the LPF 83 is reduced in the feedback loop, as shown in FIG. 7G. As a result, the feedback loop performs a so-called phase pull-in operation. As the phase pull-in operation advances, the feedback loop proceeds to a lock range to maintain a phase lock state in which the error signal is converged in the vicinity of a target value determined by an offset value. Consequently, the phase of the writing clock WCK is matched with a target phase which is the sum of the phase of the reproduced clock RCK and an offset in the high-level period of the S/H timing signal immediately before the new data is written.

The S/H circuit 84, responsive to a falling edge of the S/H timing signal, holds the value of the error signal sampled immediately before the S/H timing signal falls, and subsequently outputs the held value to the adder 85. Therefore, the phase shifter 81 is continuously specified the amount of phase shift corresponding to an addition value of the held value and the offset value even after the high-level period of the S/H timing signal has passed, so that the writing clock WCK is adjusted in phase by the amount of phase shift continuously specified after the lapse of the high-level period of the S/H timing signal.

FIGS. 7C and 7D generally and schematically show how the phases of the writing clock WCK and the reproduced clock RCK are controlled. Specifically, a hatched portion in the writing clock WCK indicates that its phase is determined by the amount of phase shift corresponding to the reference value V0 without subjected to phase matching; a cross-hatched portion in the writing clock WCK indicates that its phase is forcibly matched with the phase of the reproduced clock RCK; and a stripe portion in the writing clock WCK indicates that its phase is maintained to substantially match the phase of the reproduced clock RCK.

According to the operation of the phase matching circuit 80 as described, the phase of the writing clock WCK is adjusted to align with the phase of the reproduced clock from the written data which has been read a predetermined period before new data is written, so that the new data can be written into the disc while maintaining the continuity of the phase of a bit clock associated with the written data. With the disc on which the new data has been written as mentioned, the previously written data and the new data can be continuously reproduced in a smooth manner without any hindrance in the reproduction of the bit clock and the detection of the synchronization signal.

Next, another embodiment according to the present invention will be described.

Figure 11:
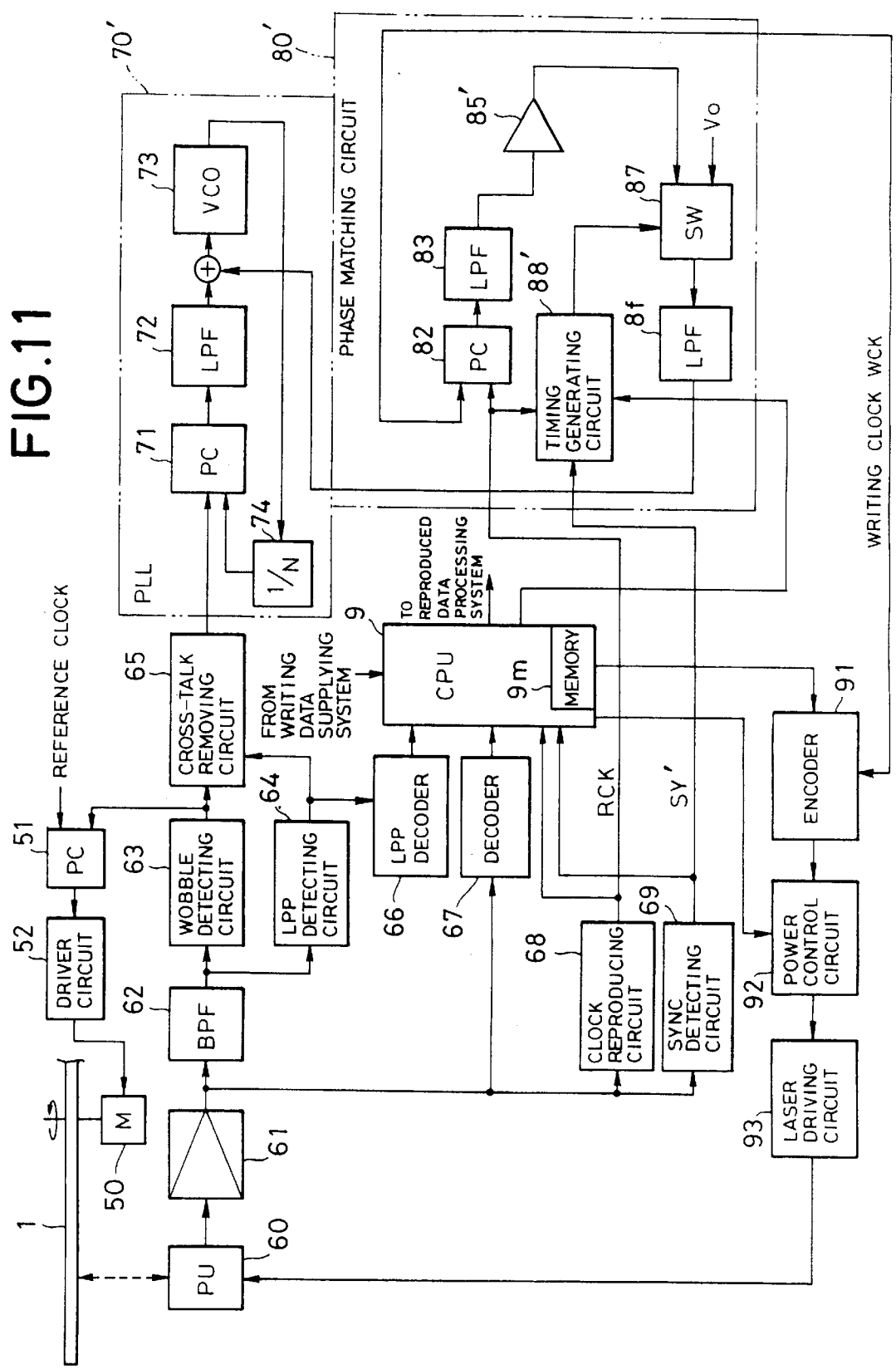
FIG. 11 is a block diagram illustrating a general configuration of an information recording apparatus according to a second embodiment of the present invention.

FIG. 11 illustrates a general configuration of an information recording apparatus according to a second embodiment of the present invention, where parts equivalent to those in FIG. 6 are designated the same reference numerals.

The information recording apparatus illustrated in FIG. 11 are basically similar to that of FIG. 6 except that the phase shifter 81, the offset generating circuit 88, and the S/H circuit 84 are omitted. For this reason, a PLL circuit 70' is modified such that an adder 7A is connected between an LPF 72 and a VCO 73, receives an output signal of the LPF 72 at one input thereof, and supplies an addition output signal to the VCO 73.

Also, in a modified phase matching circuit 80', an output signal of the VCO 73 is directly supplied to an input of a phase comparator 82, and derived as a writing clock signal WCK. Further, in the phase matching circuit 80', an output signal of an LPF 83 is supplied to an input of a loop switch 87 through an amplifier 85', and an output signal of the loop switch 87 is supplied to the other input of the adder 7A in the PLL circuit 70' through an LPF 8f. Then, a loop control signal supplied to the loop switch 87 is generated by a timing generating circuit 88' which has a similar configuration and signal generating principle to the aforementioned S/H timing generating circuit 88.

In the phase matching circuit 80', the phase comparator 82 compares the output signal of the VCO 73 (writing clock WCK) in the PLL circuit 70' with a reproduced clock signal RCK from a clock reproducing circuit 68 to generate a signal corresponding to a phase difference between the two signals which is supplied to the loop switch 87 through the LPF 83 and the amplifier 85'. The loop switch 87 selectively outputs either an output amplified error signal from the amplifier 85' or a reference signal V0 to the LPF 8f. The signal passing through the LPF 8f is added to an input control signal to the VCO 73 in the PLL circuit 70'.

In the configuration as described above, when a CPU 9 generates a loop control signal to the loop switch 87 to select the output of the amplifier 85' (for closing the loop), a phase error between the writing clock signal WCK and the reproduced clock signal RCK is produced by the phase comparator 82, and a feedback signal corresponding to this phase error is supplied to the VCO 73 through the switch 87, the LPF 8$f$ and the adder 7A. Here, the feedback signal supplied to the VCO 73 sets in the VCO 73 the amount of phase shift corresponding to the phase error, more specifically, such an amount of phase shift (instantaneous frequency) that converges the phase error to zero.

Thus, with a feedback control preformed by a loop formed by the foregoing phase comparator 82, LPF 83, amplifier 85', loop switch 87, LPF 8$f$ and adder 7A, the writing clock WCK is brought to gradually match the phase of the reproduced clock signal RCK from the clock reproducing circuit 68 from the time the loop is closed.

On the other hand, when the CPU 9 generates a loop control signal to the loop switch 87 to select the reference signal V0 (for opening the loop), the amount of phase shift (instantaneous frequency) corresponding to the reference signal V0 is set in the VCO 73 which shifts the phase of the writing clock signal WCK by the thus set amount of phase shift (in other words, the instantaneous frequency is changed). Therefore, when the loop is open, the phase matching circuit 80' is controlled to generate the writing clock WCK which has the phase adjusted as determined by the reference signal V0 independent of the reproduced clock.

However, the action of the LPF 8$f$ should be noted. The LPF 8$f$ serves to supply the VCO 73 with a feedback signal which is smoothly changed from the value of the output signal of the amplifier 85' to the value of the reference signal V0 when the loop switch 87 switches its selection from the output signal of the amplifier 85 to the reference signal V0. With this action of the LPF 8$f$, the phase of the writing clock signal WCK is gradually changed from its locked phase to a phase corresponding to the reference signal V0 after the loop is open subsequent to its phase lock state, and is eventually returned to the phase (frequency) corresponding to the reference signal V0 after a while.

The operation of the information recording apparatus according to this embodiment is shown in FIGS. 12A to 12I.

Figure 12:
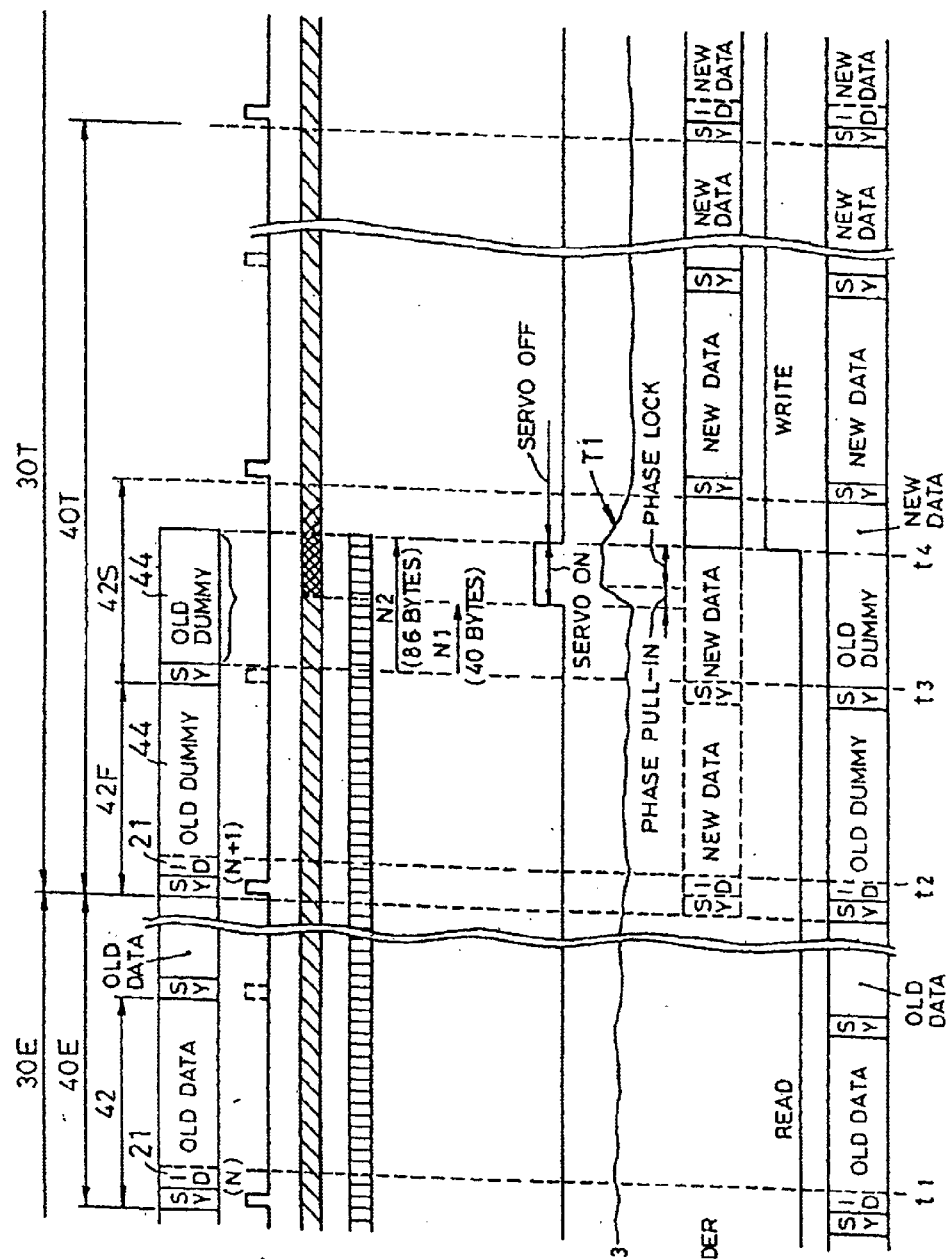
FIGS. 12A to 12I are time charts showing operational waveforms and operational forms at respective portions in the information recording apparatus of FIG. 11.

As shown in FIG. 12E, the loop control signal rises at the timing of the first count value N1 to close the phase matching loop, and falls at the timing of the second count value N2 to open the phase matching loop.

Therefore, while the loop control signal is at high level, a feedback control is executed for the phase matching circuit 80', in a direction in which an output error level of the LPF 83 in the feedback loop is reduced, as shown in FIG. 12F. As a result, the feedback loop performs a so-called phase pull-in operation. As the phase pull-in operation advances, the feedback loop proceeds to a lock range to maintain a phase lock state in which the error signal is converged in the vicinity of a target value. Consequently, the writing clock WCK is matched in phase with the reproduced clock RCK in the high-level period of the loop control signal immediately before the new data is written.

When the loop control signal falls, the phase matching loop is opened to supply the reference signal V0 to the adder 7A through the LPF 8$f$. Here, the LPF 8$f$ has a predetermined time constant, so that it does not immediately transmit the reference signal V0 as it is, even if the reference signal V0 is supplied thereto, but instead transmits to the adder 7A a signal which exponentially approaches the value indicated by the reference signal V0.

Consequently, the output of the LPF 83 after the loop is closed exhibits a slow change as indicated by T1 in FIG. 12F and reaches a level corresponding to the reference signal V0. Thus, the writing clock WCK is returned to have a frequency and a phase (i.e., a center frequency determined by the reference signal V0) inherent to the PLL circuit 70' serving as a writing clock generating means some time after additional recording is started, so that the writing clock signal WCK is synchronized with the reproduced clock RCK only at a location near the junction of the new data to the old data.

FIGS. 12C and 12D also show generally and schematically how the phases of the writing clock WCK and the reproduced clock RCK are controlled. Specifically, a hatched portion in the writing clock WCK indicates that its phase is determined by the amount of phase shift corresponding to the reference value V0 without subjected to phase matching; and a cross-hatched portion in the writing clock WCK indicates that its phase is forcibly matched with the phase of the reproduced clock RCK. It should be noted that for a while after time t4, FIG. 12C representing the writing clock WCK is drawn in such a manner that the cross-hatching pattern is gradually toned down and merges into the original hatching, thus indicating how the phase of the writing clock WCK transitions from the phase of the reproduced clock RCK to its own phase.

According to the operation of the phase matching circuit 80' as described, the phase of the writing clock WCK is likewise adjusted to align with the phase of the reproduced clock from the written data which has been read a predetermined period before new data is written, so that the new data can be written into the disc while maintaining the continuity of the phase of a bit clock associated with the written data, whereby the previously written data and the new data can be continuously reproduced in a smooth manner without disturbing the synchronization operation for the read data during reproduction of information. In addition, the second embodiment is advantageous in terms of cost because the configuration can be made relatively simple.

Figure 13:
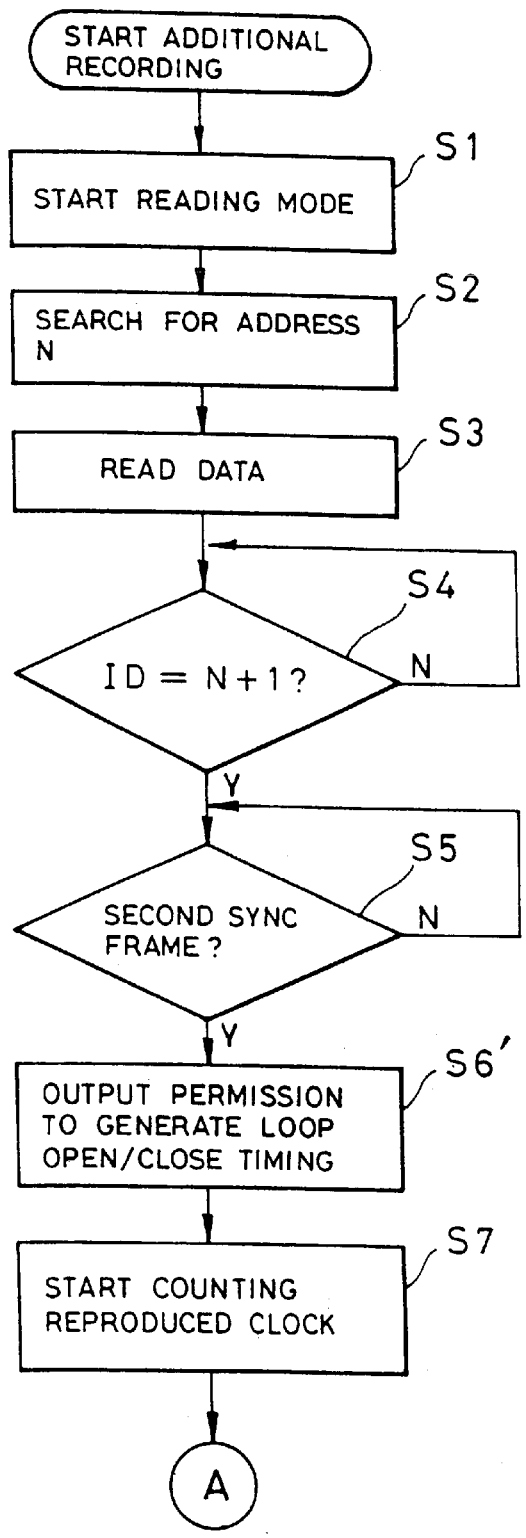
FIG. 13 is a flow chart illustrating the former half of a procedure for additional recording processing executed by a CPU in the information recording apparatus of FIG. 11.
Figure 14:
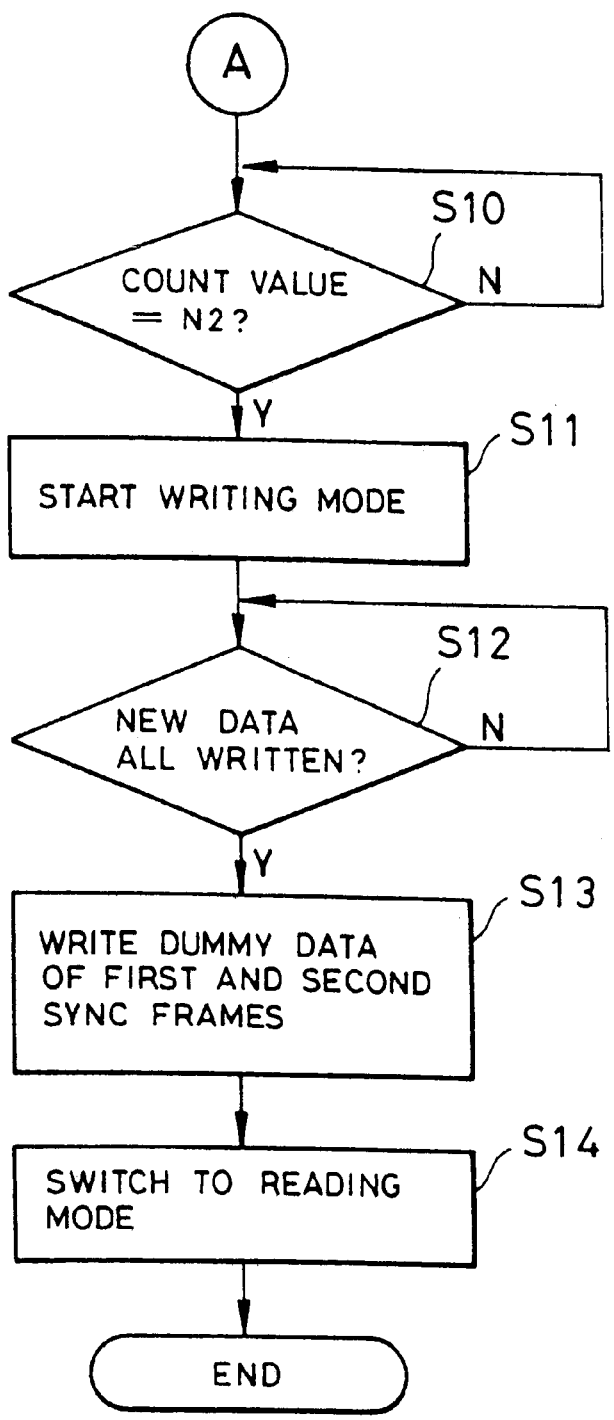
FIG. 14 is a flow chart illustrating the latter half of the procedure for the additional recording processing executed by the CPU in the information recording apparatus of FIG. 11.

The processing of the CPU 9 for performing the foregoing operation is illustrated in flow charts of FIGS. 13 and 14.

According to the flow charts, it can be seen that when a second sync frame is detected at step S5, the CPU 9 permits the timing generating circuit 88' to generate a loop control signal at subsequent step S6' and proceeds to step S7. It can be also seen that after step S7, the CPU 9 determines whether or not a count value has reached the second count value at step S10, while steps S8 and S9 in FIGS. 8 and 9 are omitted.

Next, a further embodiment according to the present invention will be described.

Figure 15:
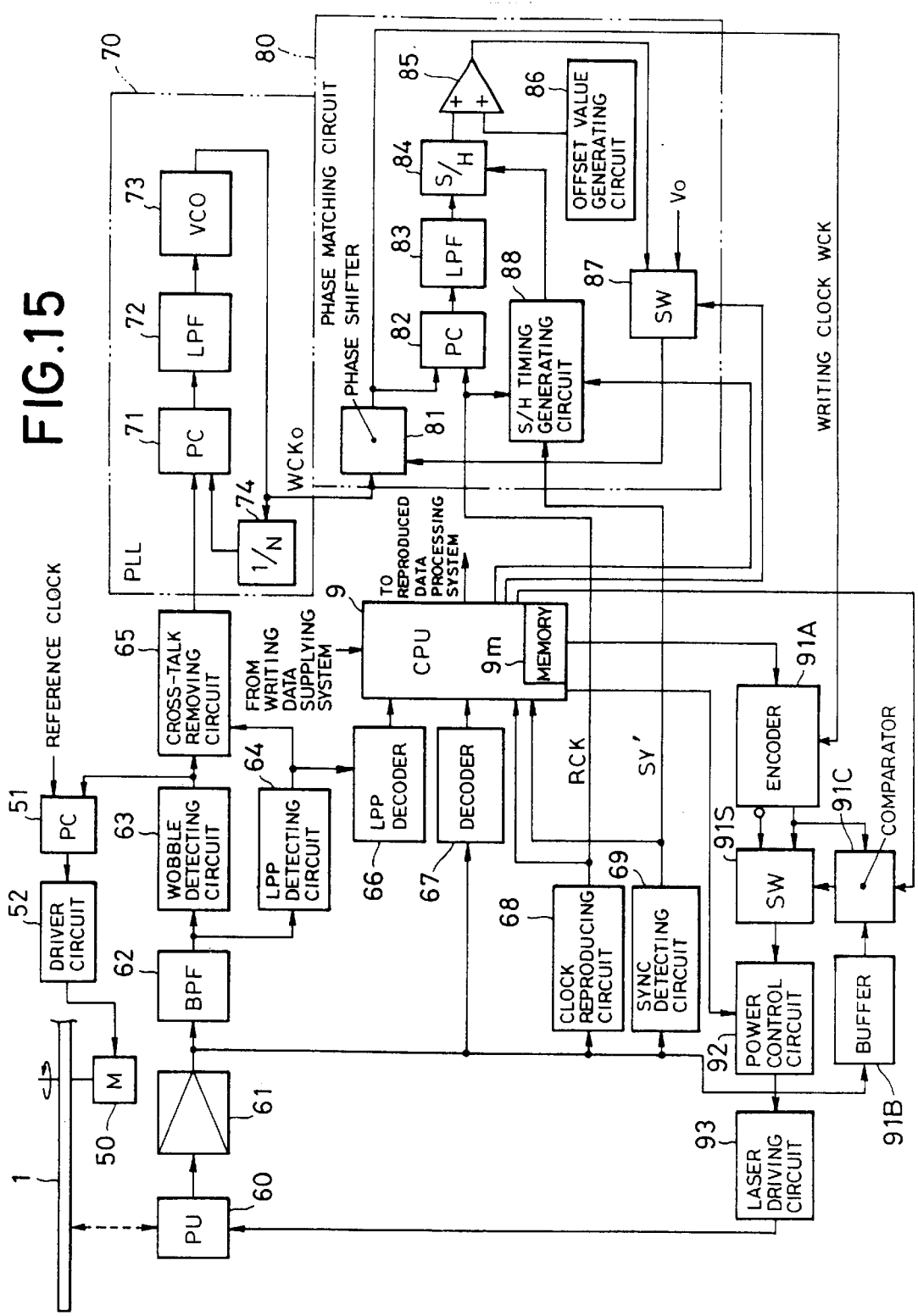
FIG. 15 is a block diagram illustrating a general configuration of an information recording apparatus according to a third embodiment of the present invention.

FIG. 15 illustrates a general configuration of an information recording apparatus according to a third embodiment, wherein parts equivalent to those in FIG. 6 are designated the same reference numerals.

In FIG. 15, an information recording system is improved over the configuration illustrated in FIG. 6. Specifically, an encoder 91A comprises two outputs, i.e., an inverting output and a non-inverting output as its encoded outputs. The two encoded outputs are supplied to a switch circuit 91S. The switch circuit 91S selectively supplies a power control circuit 92 with either the one encoded output or the other encoded output.

A buffer circuit 91B fetches a read signal from a reproducing amplifier 61 and supplies the fetched read signal to a comparator circuit 91C with a predetermined delay time (for example, corresponding to 3T which is equal to a minimum pit length Tmin, by way of example). The comparator circuit 91C, responsive to a comparison determining trigger signal supplied thereto from the CPU 9, compares the value of the output of the buffer circuit 91B with the value of the non-inverting output of the encoder 91A, and supplies a control signal to the switch circuit 91S to select the inverting output of the encoder 91A when the two values are coincident.

According to the configuration as described above, it is possible to avoid a data pattern that may cause an inconvenience due to a combination of the end of previously written data and the top of new data upon additional recording.

Advantageous effects unique to the third embodiment as above can be described in detail with reference to FIG. 16.

Written data shown in FIG. 16A is delayed by the buffer circuit 91B by a time period corresponding to 3T as shown in FIG. 16B. As shown in FIG. 16C, the power control circuit 92 begins fetching data from the non-inverting output of the encoder 91A at time t4 in a manner similar to the aforementioned embodiments.

While the written data is interrupted after time t4, the comparator circuit 91C is supplied from the CPU 9 with a comparison determining trigger which rises at time t4 and has a pulse width corresponding to 3T, as shown in FIG. 16D, and the written data output from the buffer circuit 91B with a delay corresponding to 3T, so that the comparator circuit 91C compares the input data with the data from the non-inverting output of the encoder 91A. In other words, the final 3T portion of the written data is compared with the first 3T portion of the data from the non-inverting output of the encoder 91A.

The comparator 91C, when determining that the values of the two data are coincident, forces the switch circuit 91S to transfer the data from the inverting output of the encoder 91A to the power control circuit 92, and subsequently the recording operation is continued with data from the inverting output of the encoder 91A. Data after the additional recording shown in FIG. 16E represents this recording operation. Conversely, when determining that the values of the two data are not coincident, the comparator 91C forces the switch circuit 91S to continue to transfer data from the non-inverting output of the encoder 91A to the power control circuit 92.

In this way, it is possible to prevent an end portion of the written data from having the same value as a top portion of new data which is combined thereto.

Assuming for example that logical values "0" continue over 7T at the end of written data and logical values "0" also continue over 7T at the beginning of new data, the resulting data pattern would have logical values "0" successively over 14T if both the data are simply combined. This pattern including successive logical values "0" over 14T is coincident with a pattern which should be given only to the synchronization signal SY in this embodiment. In other words, the same data pattern as the synchronization signal SY is unintentionally formed at the junction of the two data, causing the sync detecting circuit to erroneously detect this data pattern as the synchronization signal SY during subsequent reproduction of information.

On the other hand, since the third embodiment forcibly inverts new data in such a case to prevent the formation of a pattern unintentionally identical to the synchronization signal SY, thereby making it possible to avoid erroneous detection of the synchronization signal.

While in the third embodiment, logical values of new data are inverted when a portion at the end of written data is the same as a portion at the beginning of the new data, the values may be changed in such a manner that the contents of the data are not substantially changed as is the case of the foregoing inverting processing.

While in the foregoing description, each sync frame of the top recording sector 40T, in which data is additionally recorded, stores new data, dummy data may be stored therein instead of the new data, as described in Laid-open Japanese Patent Application No. 9-270171.

Also, while the foregoing embodiments have been described mainly for the DVD-R as a recording medium, the present invention is applicable to any other additionally recordable recording medium.

Further, while the sync frame synchronization signal SY has been taken as an example of the particular synchronization signal, the present invention may also be realized by specifying as the particular synchronization signal another synchronization signal which is provided in each predetermined data block having the amount of information different from the sync frame.

Furthermore, the foregoing embodiments have been described for the case where new data is additionally recorded on a disc on which the end of recorded old data is followed by old dummy data as shown in FIGS. 7A to 7J. The present invention however can be realized even without providing such intervention as the old dummy data between the old data and the new data. Specifically, significant effects can also be produced when the phase matching is performed in a sync frame which stores old data to synchronize a writing clock for new data.

While in the foregoing embodiments, a variety of means have been described in a rather limitative manner, they may be otherwise modified as appropriate within a scope in which those skilled in the art can design.

As described above in detail, according to the information recording apparatus of the present invention, it is possible to employ a recording scheme for a recording medium which can smoothly reproduce previously written data and additional data subsequent thereto in succession without disturbing the synchronization operation for read data during reproduction of information.

What is claimed is:

1. An information recording apparatus capable of recording new data subsequent to previously written data on a recording medium, comprising:

a writing clock generator for generating a writing clock signal having a frequency and a phase for writing the new data into said recording medium while establishing synchronization with the new data;

a clock reproducing component for reading said written data from said recording medium, and reproducing a synchronization clock signal of said written data to generate a reproduced clock signal; and a phase adjuster for synchronizing said writing clock signal in phase with said reproduced clock signal, and subsequently gradually returning frequency and phase of said writing clock signal to a first frequency and a first phase inherent to said writing clock generator with a predetermined time constant.

2. The information recording apparatus according to claim 1, wherein:

said written data is data in which a particular synchronization signal is arranged in a predetermined number of data blocks, and said information recording apparatus further comprises:
a synchronization signal detector for detecting said particular synchronization signal from said written data;
a counter responsive to a detection timing of said particular synchronization signal by said synchronization signal detector for starting a counting operation based on said reproduced clock signal; and a controller for determining a writing start time of writing of said new data onto said recording medium, based on a count value of said counter.

3. The information recording apparatus as claimed in claim 1, wherein:

said phase adjuster synchronizes said writing clock signal in phase with said reproduced clock signal derived from said written data in a predetermined period before an additional recording start position on said recording medium for said new data.

4. The information recording apparatus as claimed in claim 2, wherein:

said phase adjuster synchronizes said writing clock signal in phase with said reproduced clock signal derived from said written data in a predetermined period before an additional recording start position on said recording medium for said new data.

5. An information recording method capable of recording new data subsequent to previously written data on a recording medium, comprising:

reading said written data from said recording medium, and reproducing a synchronization clock signal of said written data to generate a reproduced clock signal;

generating, via a writing clock generator, a writing clock signal having a frequency and a phase for writing the new data into said recording medium while establishing synchronization with the new data; and synchronizing said writing clock signal in phase with said reproduced clock signal, and subsequently gradually returning frequency and phase of said writing clock signal to a first frequency and a first phase inherent to said writing clock generator with a predetermined time constant.

6. An information recording method as claimed in claim 5, wherein:

said written data is data in which a particular synchronization signal is arranged in a predetermined number of data blocks, and said information recording method further comprises:

detecting said particular synchronization signal from said written data;

counting responsive to a detection timing of said detected particular synchronization signal for starting a counting operation based on said reproduced clock signal; and determining a writing start time of writing of said new data onto said recording medium, based on a count value from said counting.

7. The information recording method as claimed in claim 5, wherein:

said synchronizing synchronizes said writing clock signal in phase with said reproduced clock signal derived from said written data in a predetermined period before an additional recording start position on said recording medium for said new data.

8. The information recording method as claimed in claim 6, wherein:

said synchronizing synchronizes said writing clock signal in phase with said reproduced clock signal derived from said written data in a predetermined period before an additional recording start position on said recording medium for said new data.

9. An information recording apparatus capable of recording new data subsequent to previously written data on a recording medium, comprising:

a clock reproducing generator for reading said written data from said recording medium and generating a synchronization clock signal for said written data;

a writing clock generator for generating a writing clock signal having a frequency and a phase for writing the new data into said recording medium, wherein said writing clock signal has a first frequency and a first phase based on a time constant; and a phase adjuster for generating a reproduced clock signal based on said synchronization clock signal, approximately synchronizing said writing clock signal with said reproduced clock signal, and subsequently adjusting the frequency and the phase of said writing clock signal to approximately the first frequency and approximately the first phase.

* * * * *